(12) United States Patent
Gunn

(10) Patent No.: US 6,967,098 B2
(45) Date of Patent: Nov. 22, 2005

(54) PROCESS FOR CHANGING THE APPEARANCE OF STONE, CONCRETE, OR HARD SURFACES BY APPLYING MICROORGANISMS

(76) Inventor: Robert Gunn, Glan Nant, Llandeltyd, Dolgeilou, Gmynagdd, Wales LL40 2TA (GB)

( * ) Notice: Subject to any disclaimer, the term of this patent is extended or adjusted under 35 U.S.C. 154(b) by 456 days.

(21) Appl. No.: 10/139,030

(22) Filed: May 1, 2002

(65) Prior Publication Data

US 2003/0026902 A1 Feb. 6, 2003

(30) Foreign Application Priority Data

May 5, 2001 (GB) .............................. 0111699

(51) Int. Cl.[7] .............................. B09B 3/00; C12C 1/00; C12C 1/20
(52) U.S. Cl. ...................................... 435/262; 435/243
(58) Field of Search ................................ 435/262, 243

(56) References Cited

U.S. PATENT DOCUMENTS

| 4,346,175 | A | * | 8/1982 | Enfors et al. ............ 435/317.1 |
| 5,244,493 | A |   | 9/1993 | Brierley et al. ............... 75/743 |
| 5,429,659 | A |   | 7/1995 | Spencer et al. ............... 75/711 |
| 5,672,194 | A |   | 9/1997 | Hunter et al. ................. 75/712 |
| 5,679,393 | A |   | 10/1997 | Laur ........................... 426/417 |
| 5,834,294 | A |   | 11/1998 | Brierley et al. ............. 435/243 |
| 6,099,615 | A |   | 8/2000 | Underwood .................. 75/772 |
| 6,159,726 | A |   | 12/2000 | Kohr ........................... 435/262 |
| 2001/0001065 | A1 | | 5/2001 | Kohr ........................... 435/262 |

FOREIGN PATENT DOCUMENTS

SU 910815 B * 3/1982

* cited by examiner

Primary Examiner—David M. Naff
Assistant Examiner—Deborah K. Ware
(74) Attorney, Agent, or Firm—Denison & Assoc, PC; JoAnne M Denison; Zareefa B. Flener

(57) ABSTRACT

A preferred method by which microorganisms and nutritive media are sprayed, brushed, dripped, or otherwise applied, onto freshly cut rock, stone, freshly formed concrete, or other hard manmade surface, in order for the target surface to take on a weathered appearance in the least amount of time. The present inventive product and process by product creates a process by which surface materials may be scraped or gathered from a nearby location, mixed with water and/or a nutritive media, and either further treated to promote additional growth of necessary microorganisms, or the directly applied to the surface of the freshly cut rock or stone, or freshly formed concrete or other hard, manmade surface thereby providing a weathered appearance in the shortest period of time. Newly built structures of rock, stone, concrete, or other hard surface are thus provided with an appearance which fits into mature and established areas.

22 Claims, 1 Drawing Sheet

PROCESS FOR CHANGING THE APPEARANCE OF STONE, CONCRETE, OR HARD SURFACES BY APPLYING MICROORGANISMS

FIELD OF THE INVENTION

The present invention relates to the field of applying a complex micro-organic community and nutritive media to freshly exposed stone or rock or freshly formed concrete or other hard, man made surface in order to expedite the colonization of organisms including bacteria, algae and mosses, such that the color of the hard surface is changed to a darker, more natural color which is more weathered and aesthetically pleasing in appearance.

BACKGROUND OF THE INVENTION

Recently exposed stone faces, for example in quarry faces, road and rail cuttings, scree slopes, concrete structures and new building stone, can cause visual pollution given their stark contrast with more mature "weathered" surroundings. The problem of the visual impact of newly exposed stone has been recognized by several authorities, including the Department of the Environment, U.K., which has funded research into quarry restoration, and by the Design Council, U.K. and English Heritage, U.K. which has researched the problem on buildings.

In the past, the only solution to the problem of visual pollution was to allow time for the slow natural colonization of the surfaces by microorganisms, which brought about a color change to the stone, alleviating the negative visual impact. Expediting this provcess has at times been attempted on a small scale, by the addition in-situ to structure repairs of substances such as soot and manure. Some such methods are described in "Lichens on Man-Made Surfaces; Encouragement and Removal," F. Dobson, British Lichen Society, 1996. In quarries, the visual impact of the newly exposed faces has sometimes been addressed by burying the faces with scree. This method is described in "Landform Replication as a Technique for the Restoration of Limestone Quarries," J. Gunn et. al., 1992. H.M.S.O. In conjunction with this latter method, hydraulic seeding, which is a method of spraying grass seeds in a nutritive medium over near horizontal soil surfaces is sometimes used.

On a laboratory scale, micro organic communities are sometimes encouraged to grow on stone so that their impact on the stone surface can be studied for biological research purposes. Nutritive media are used to encourage this growth. Some of these media are given in "Handbook of Media for Environmental Microbiology", R. M. Atlas, 1995. However, these microorganisms are only grown on the stone surface for a relatively short period of time, and not long enough in order to effectuate a visual stone change and produce an aesthetically pleasing appearance to outdoor, weathered stone.

Allowing only natural-time colonization of the stone surfaces is extremely slow, and burying methods on a large scale are expensive. What is needed in the art is a method of speeding up the colonization of the newly exposed stone surfaces by the natural pioneering micro-organic community, using the acquisition of suitable pioneering communities and their application to the stone faces by a method which accelerates their colonization.

SUMMARY OF THE INVENTION

The present invention consists of preferred methods or embodiments by which pioneering microorganisms are sprayed, dipped, brushed or otherwise applied onto a freshly exposed rock or stone surface, or freshly formed concrete or other hard, man made surface, in order to establish communities of appropriate microorganisms on the surface and thereby change its appearance into a more aesthetically pleasing surface with greater natural color in order to blend into the surrounding natural environment. The present invention may also be used in situations where new light coloured stonework on buildings, walls, pathways or other surfaces appears and it is desired to give the surface an older appearance either for aesthetic purposes or to blend in with older buildings, walls, pathways or other surfaces which may be present nearby.

With the prescribed inventive method, microorganisms of lithobiont communities of bacteria and algae are grown under optimal conditions of heat and in a nutritive media and then this concentrated organic media is sprayed, dipped, brushed or otherwise applied onto the desired stone or concrete formation. Because the lithobiont mixture is in concentrated form, the inventive substance is capable of more quickly and efficiently etching the surfaces of the stone or concrete to which it is applied and appropriate microorganisms are able to propagate and flourish under optimal conditions. Then the surface becomes weathered in appearance in the most expeditious manner possible.

Accordingly, it is believed that by utilizing the processes described herein, freshly cut or formed stone, rock, concrete, etc. will be able to relatively quickly take on a weathered appearance which otherwise typically takes up to twenty years to achieve. The present inventive process takes as little as 6 months to 2 to 3 years to accomplish the same task as does mother nature over several decades.

Two versions of preferred embodiments of the inventive process have been developed for both large and small areas in which treatment is desired. In the first preferred embodiment which is intended for use in relatively large areas to be treated, a semi-permanent irrigation system is installed to apply the lithobiont innoculant and media at regular intervals in controlled quantities. In order to initiate the lithobiont growth, a quantity of surface material is collected from a local mature exposure and this material is suspended in water. At this juncture, the collected material in a water suspension may either be directly applied to the area desired to be treated, or it may be transported to a laboratory or proper facility where the suspension material is supplied with additional water and nutritive media and the lithobiont mixture is allowed to grow and flourish under optimal conditions. In addition, if it is determined that certain microorganisms present in the lithobiont mixture are not desired, then the appropriate selective biocide may be introduced into the mixture in order to eliminate undesireable mircroorganisms.

Where it is not practical or desirable to obtain organic surface materials from the mature surrounding region, it may be possible to match the locality to be treated with organic surface materials obtained from a more remote region which most closely approximates the surface type and weather conditions in the area to be treated. While this is not preferred, it may be utilized where surrounding organic surface materials are for some reason, insufficient or inappropriate to utilize. This may occur where the area is especially urban, or it is polluted with improper chemicals or materials.

Although a variety of chemicals may be selected for inclusion in the nutritive media chosen for the lithobiont mixture, the following chemicals are utilized in at least one preferred embodiment: potassium, magnesium, sodium, iron, hydrogen, manganese, zinc, copper and cobalt as anions; and nitrate, phosphate, sluphate, cirtrate, borate, choride and molybdenate.

In one preferred embodiment of the present invention, during the first or initial stages of spraying the final lithobiont mixture to be applied is further mixed with an adhesive component to assist the mixture in adhering to vertical or inclined surfaces. This final lithobiont mixture may also be mixed with a dye marker substance, where desired, so that the user applying the mixture to the desired surface will be able to readily determine the amount and placement of proper coverage of the mixture used on the surface.

In later stage spraying or applications of the lithobiont mixture, adhesives are not used because they not only tend to clog the spraying mechanism or applicator used to apply the mixture, but they would also inhibit growth of the established colony with unnecessary substances in the mixture. It is important to note that applying the mixture at the proper intervals during the process is critical because new or established organisms can quickly die out, or have their growth severely retarded, if the interval between applications is too greatly spaced apart and the organisms have completely dried out.

Where the inventive process is utilized in smaller areas or on buildings, it may not be necessary or advisable to use automated spray equipment, and the mixture may be simply sprayed on by manual labor, or it even may be brushed on by hand. In such a manner, a rapid and efficient method of colonization of microorganisms may be achieved by the user of the inventive method, leading to an attractive and aesthetically pleasing concrete, stone or rock surface within the least amount of time possible.

OBJECTS OF THE INVENTION

Thus, it is one primary object of the present invention to provide an improved method by which an appropriately selected lithobiont community may be sprayed or otherwise applied onto freshly cut rock or stone, or freshly formed concrete or other hard, man made surface, in order for the subject surface to take on a weathered appearance in the least amount of time.

It is yet another primary object of the present invention to provide an improved method by which an appropriately selected lithobiont community is created by scraping or gathering materials from a nearby location with an established, mature community of microorganisms and then mixing this material with water in order to create a proper solution for application to a desired surface of freshly cut rock or stone, or freshly formed concrete or other hard, man made surface.

It is still another primary object of the present invention to provide an improved method by which an appropriately selected lithobiont community is created by scraping or gathering materials from a nearby location with an established, mature community of microorganisms and then mixing this material with water in order to create a starter mixture which may be transported to a laboratory or other appropriate location and the mixture being allowed to incubate with an optimal nutritive additives and under optimal temperature conditions until the lithobiont community is appropriately established in larger quantities for application to a desired surface of freshly cut rock or stone, or freshly formed concrete or other hard, man made surface.

Yet an additional primary object of the present invention is to provide an improved method by which an appropriately selected lithobiont community is created by cross matching and analyzing the area to which lithobiont material is to be applied with another desired area which has similar microorganisms present and weather conditions.

Yet another primary object of the present invention is to provide an improved method by which an adhesive is added to an appropriate lithobiont mixture to improve its adherence capabilities to vertical or inclined surfaces in order to facilitate the establishment of microorganisms onto a desired surface of freshly cut rock or stone, or freshly formed concrete or other hard, man made surface.

A further primary object of the present invention is to provide an improved method of utilizing a lithobiont mixture to facilitate the growth of microorganisms upon a surface wherein a dye marker is added to an appropriate lithobiont mixture before it is sprayed onto a desired surface so that the user is able to determine the appropriate placement and coverage of the lithobiont mixture in order to optimize its application.

Still an additional primary object of the present invention is to provide an improved method of utilizing a lithobiont mixture to facilitate the growth of microorganisms upon a surface wherein the lithobiont mixture is applied to the surface at regular intervals during the day and night so as to avoid the dessication of microorganisms already established upon the surface which would result in their death, or severely retard their growth.

It is a further primary object of the present invention to provide an improved method of utilizing a lithobiont mixture wherein existing mature surface materials are mixed with water and an appropriate nutritive materials, which nutritive materials may include some or all of the following: potassium, magnesium, sodium, iron, hydrogen, manganese, zinc, copper and cobalt as anions; and nitrate, phosphate, sluphate, cirtrate, borate, choride and molybdenate as cations.

Still yet an additional primary object of the present invention is to provide an improved method of utilizing a lithobiont mixture which may be automatically sprayed, hand sprayed or even brushed onto freshly cut rock or stone, or freshly formed concrete or other hard, man made surface, in order for the subject surface to take on a weathered appearance in the least amount of time.

These and other objects and advantages of the present invention can be readily derived from the following detailed description taken in conjunction with the accompanying drawing present herein and should be considered as within the overall scope of the invention.

DETAILED DESCRIPTION OF THE PRESENT INVENTION

Figure 1:
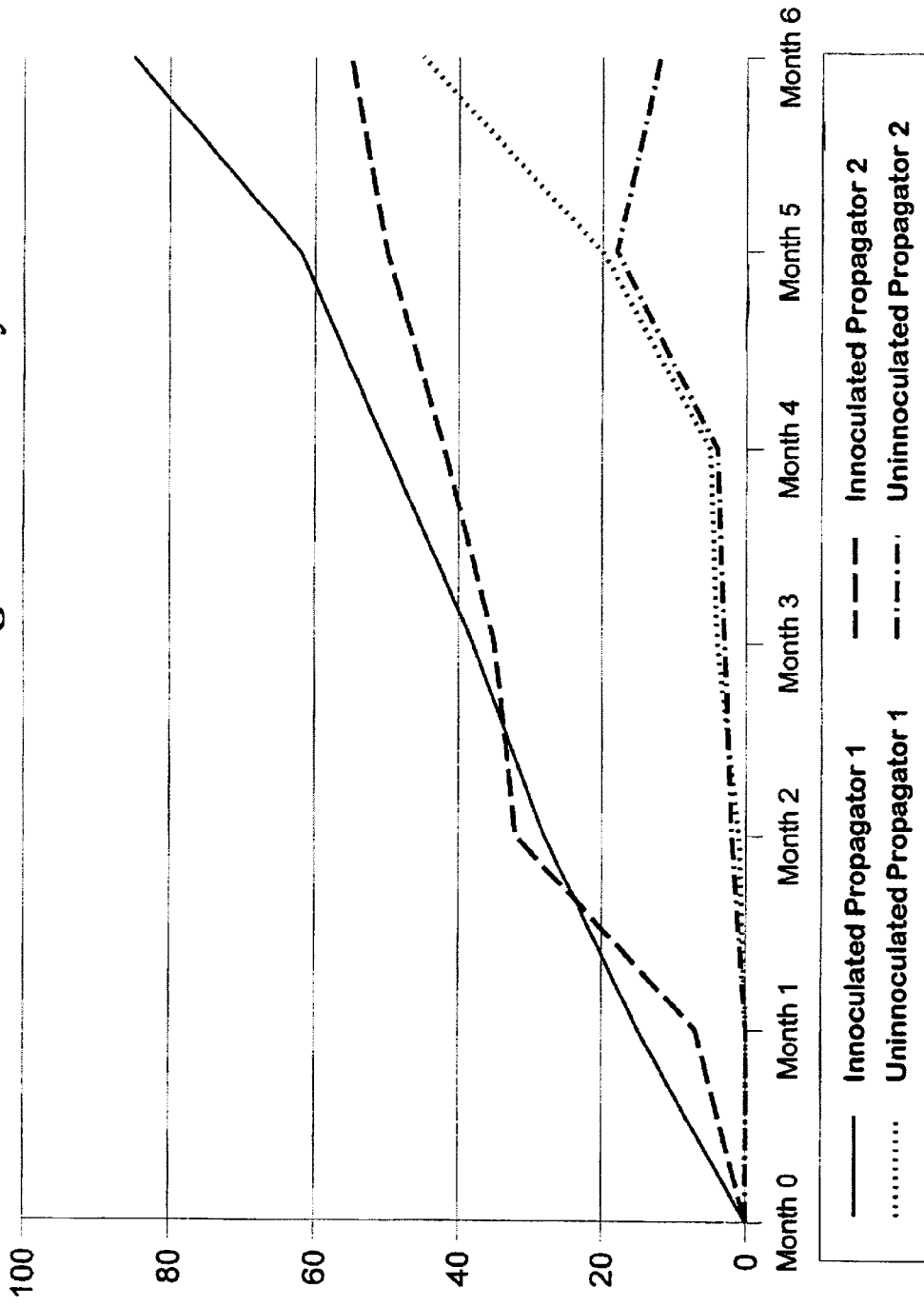
FIG. 1 is a graph drawing of the Mean Colour Change of Laboratory Blocks for both innoculated propagators and uninnoculated propagators.

The process of the instant invention will be found to darken and more fully color light colored freshly exposed stone surfaces in order to approximate the color of much older exposures within a much shorter timescale than the natural processes which darkened the original exposures. The purpose of this is to reduce the visual impact of newly exposed stone. This reduction is visually beneficial in large exposed surfaces produced by excavation in light coloured stone both for quarrying and engineering purposes. The most common stone types which encounter this visual impact are limestones but other stone types may also benefit from the process. It is also beneficial for matching new light coloured stonework on buildings where contrast is made with nearby older stonework which have already darkened naturally. This applies to local repair or extension of stonework on a single building and to construction of a new building in an area where older buildings already exist. It can also be used to ameliorate the visual impact of concrete structures and stone screes slopes, where these have been introduced into an area.

The process performs this by acceleration of the growth of the natural micro-organisms which cause darkening of stone over an extended period commencing once the surface has been exposed. The micro-organisms are lithobiont communities, including bacteria and algae which colonise the stone surfaces by etching their surfaces to form minute depressions in the stone in which to exist and this enables them to colonise vertical surfaces as well as any other inclination.

In normal conditions the micro-organisms derive sustenance from carbon dioxide in the atmosphere, from rainwater and from minerals from the stone surface. This natural colonization takes place over an extended time scale commonly about twenty years depending on the aspect of the surface and the climate to which it is exposed. In the preferred embodiments described more fully herein, the acceleration of the process matches darkening comparable to much older surfaces in one to three years. The process firstly achieves this by applying a supply of micro-organisms in much greater quantities than usual ("innoculant"). Secondly, it supplies the augmented quantity of organisms with beneficial nutrients which accelerate their growth so that the surface becomes covered much more quickly ("medium"). Two versions of the process have been developed for large and small areas to be treated.

For large areas comprising recently completed quarry faces, newly constructed stone cuttings and embankments, scree slopes, and large quantities of freshly quarried dimension stone and concrete, a semi-permanent irrigation system is installed to apply the innoculant and medium at regular intervals in controlled quantities.

The innoculant used is to be composed of species of micro-organisms resident within the locality as found on adjacent stone surfaces. This is to utilize the benefits of species selected by the local environment and to avoid introducing species alien to the locality. In this context "local" is given to mean derived from preferably within a three (3) kilometer geographical radius and certainly within a five (5) kilometer radius. The innoculant is prepared by one of the following means. A quantity of surface material may be collected from a local mature exposure containing local micro-organisms in powder form by abrasion of the surface which is then used directly in suspension in water as the manganese, zinc, copper, and cobalt. The cations include nitrate, phosphate, sulphate, citrate, borate, chloride, and molybdenate. A typical solution, named Modified Knop's Medium, would be applied with the following composition.

TABLE 1

| concentration | ingredient |
| --- | --- |
| 0.625 gm/l | $KNO_3$ |
| 0.625 gm/l | $KH_2PO_4$ |
| 0.125 gm/l | $MgSO7H_2O$ |

TABLE 1-continued

| concentration | ingredient |
| --- | --- |
| 0.15 gm/l | $Na_3C_6H_5O_7 2H_2O$ (Tri sodium citrate) |
| 0.018 gm/l | $Fe_2(SO_4)2$ |
| 0.16 gm/l | $CaCl_2 2H_2O$ |
| 3.6 mg/l | $H_3BO_3$ |
| 2.3 mg/l | $MnCl_2 4H_2O$ |
| 0.28 mg/l | $ZnSO_4 7H_2O$ |
| 0.49 mg/l | $Na_2MoO_4 2H_2O$ |
| 0.10 mg/l | $CuSO_4 5H_2O$ |
| 0.05 mg/l | $CoCl_2 6H_2O$ | innoculant. The second method is a development of the first in that the local exposure is again similarly harvested but the product is cultured in water in a laboratory using a supply of medium and favourable ambient conditions of warmth and light. Typically a temperature of 20 degrees Celsius and full daylight level for sixteen hours per day provides optimal rapid growth. This method provides a sufficient quantity of innoculant without having to strip excessive areas of natural stone.

The third method follows the second but in a case where one or more component species may be considered to be detrimental to the process, these species may be removed by introduction of a selective biocide.

The fourth method is a contingency for occasions when no local material can be harvested other than for identification purposes, in which case imported species identical to the local suite are used having ensured that there are no extraneous species present.

It should further be noted at this point that it is not feasible or necessary to specify the species of micro-organisms because these are specific to the localities. In practice it is probable that some species will be common to many sites; but others may not, and their ommision could give rise to a poor or inadequate match of the treated area with older areas. It is therefore necessary to define the range of species as those are found locally rather than by species names.

The medium for nutrition of the micro-organisms is a water based solution of chemicals which the micro-organisms use for their development. Their other requirement is carbon dioxide drawn from the atmosphere. The medium is a water solution of chemicals which includes the following anions: potassium, magnesium, sodium, iron, hydrogen, The above composition is a general one designed to foster most types of microorganisms, but in some applications this particular composition might be varied in order to suit suites of microorganisms, either to limit growth of some species which are not desired or to stimulate growth of those that are desired. These variations would be determined by laboratory trials and assessment of local conditions prior to the application. It is intended that such variations can be incorporated into the patent.

The spraying of the stone surfaces is carried out in two stages though only one or other stage might be used in some applications, as determined by laboratory tests beforehand. In the first stage or primary spraying, a solution of medium containing a suspension of innoculant together with a solution of adhesive is applied by directed spray, drip or other application onto all parts of the surface to be treated. The adhesive contains a marker dye to enable the operator to observe which parts have been treated and so enable all the surface to be covered. The adhesive and dye are part of established hydraulic grass seeding technique as also is the pump and monitor used to spray. This spraying adheres to the surface but the adhesive gradually decays by which time some of the organisms have become established on the surface under treatment. This establishes an initial colony which is nurtured and augmented by the second stage.

The second stage is regular interval spraying by a fixed irrigation system delivering a water based solution of medium and suspension of innoculant. No adhesive is used in this stage because it would choke the spray system and inhibit development of microorganisms. The medium would be of the composition in Table 1 or as modified, and the innoculant would be added at the rate of approximately 0.1 milligram per liter of medium solution. The solution with suspension is applied by a system of storage tanks, mixers, meters, timers, climate monitors and pipework to spray heads arrayed against the surface to be treated which is a technique familiar to those versed in the art. The spray arrangement must be aligned to cover all parts of the surface in the case of irregular steep or vertical surfaces such as quarry faces because fluid applied only at the top of the surface tends to collect and flow in crevices and omit plane or projecting areas.

Preferably, the spray is applied at intervals arranged such that the surface does not dry completely for periods of greater than two hours. Though the micro-organisms can survive dry conditions, the growth is slowed down by such conditions. Application is found to be best when commenced in March in the Northern Hemisphere climates with Winter freezing and continued to November.

One such season of spraying would normally establish growth which would be completed to a mature stage in one to two years therefrom. In the Southern hemisphere the seasons would be reversed but in any tropical or sub-tropical climate there would be no significant seasonal constraint. A further product in the later stage of this treatment is the derivation of soil material from the stone etched by the micro-organisms as dust and the micro-organisms themselves. This collects on horizontal surfaces in and about the treated area and provides a habitat for plants to colonize. The medium is also beneficial to plant life and assists in its development. The plant development contributes to the reduction of the visual impact of the stone surface.

A preferred embodiment is the treatment of a vertical quarry face of dimensions such as a height of 15 meters and length of 100 meters with application of solution with suspension twice in twenty four hours at 10 a.m. and 4 p.m. In dry conditions as detected by a simple rainfall monitor, the rate of distribution for each spraying would be at 0.25 liters per square meter. In wet conditions where rainfall would supply an appreciable amount of water other than by irrigation, the amount of water in the spraying would be reduced to 0.08 liters per square meter, but with the same content of solids i.e. chemicals and innoculant as in dry conditions. In this case, the rainwater would make up the difference in water applied partially wholly or in excess. Variations might be made to such a regime depending on location and climate, or by more complex weather monitoring control equipment.

This method of application would also be used for engineered stone exposures such as cuttings, embankments or complete or partial buildings, pathways, walls and structures, or concrete or other hard, man mad surfaces, or scree slopes, and for treating suitably stacked or laid out prepared dimensions or ornamental stone before use in construction or landscaping.

For smaller areas such as on repaired or extended parts of old stone buildings or structures, the application of the primary coating with use of adhesive would be made using similar but small scale equipment. In some applications, this primary stage might be omitted if it were determined to be unnecessary by laboratory tests, or the first stage might similarly be used without the second. A solution of medium containing a suspension of innoculant together with a solution of adhesive is applied by directed spray or by brush onto all parts of the surface to be treated. Older areas of stone not to be treated may be masked to prevent spraying depending on necessity as established by laboratory tests and experience. The adhesive contains a marker dye to enable the operator to observe which parts have been treated and so enable all the surface to be covered. The adhesive and dye are part of established hydraulic grass seeding technique, as also is the equipment used to spray.

This treatment adheres to the surface but the adhesive gradually decays by which time some of the organisms have become established on the surface under treatment. This establishes an initial colony which is nurtured and augmented by the second stage. The second stage is regular interval spraying by a manual irrigation system or application by brush to deliver a water based solution of medium and suspension of innoculant. No adhesive is used in this stage because it would inhibit development of microorganisms. The medium would be of the composition provided in Table 1, or as modified, and the innoculant would be added at the rate of 0.1 milligrams per liter of medium solution or less. The solution with suspension is applied by manual equipment from a stock of solution.

Because it may not be considered to be economically feasible to install an automated spray system for small areas, manual spraying may be undertaken at a fixed time interval of from once daily to once every seven days might be preferable. The application would fully wet the area under treatment and be at a rate of the order of 0.05 to 0.25 liters per square meter, depending on the nature of the stone surface and the wetness of ambient conditions. This regime will result in periods of drying out of the surface and though the microorganisms can survive dry conditions, the growth is inevitably slowed down, but the accurate application by manual means partly compensates for this.

Application during the seasons of spring, summer and autumn is preferred, but because the equipment is not frost susceptible, spraying could be carried out at any time of year when conditions are not actually freezing, especially suitable to more temperate climates.

EXAMPLE 1

Eighteen (18) Rectangular blocks (100 mm by 80 mm) of Carboniferous Limestone from a quarry site in North Wales were prepared with a natural fracture surface presented uppermost and sterilized. Twelve (12) of these were sprinkled with grains of innoculant derived by harvesting of an old surface at the same quarry and placed (6 in each) in two propagators. At the same time, three (3) blocks which had not been exposed to innoculant were placed in each of the propagators. The propagators were fitted with a spray system, which delivered at a rate of five (5) liters per square meter, directed onto the upward facing natural fracture surface of each block, in one application per day. The contents of Propagator 1 were sprayed with a medium solution of the composition previously give above in Table 2, with rainwater collected from the same general site as the blocks. The contents of Propagator 2 were sprayed with rainwater only. The propagators were illuminated to the level of indirect sunlight for sixteen hours per day and kept at a temperature of 20 degrees Celsius. The propagators were not hermetically sealed so that air could enter and provide carbon dioxide for micro-organisms to respire. The bottom tray of each propagator retained some liquid after spraying which by evaporation provided humid conditions in the propagator to diminish dessication of the blocks between sprayings.

The blocks were removed and colour photographed in the same lighting conditions and with the same film type each month. Treatment and photography continued for six months. At the end of the six months, the photographs were compared using the Idrisi programm cluster analysis geographical information system to assess color change with the results in FIG. 1.

In FIG. 1 it is evident that colour development by the innoculated blocks in Propagator 1, treated with nutritive media was stronger than by those in propagator 2, treated with rainwater, and both were stronger than the uninoculated blocks. The colour change in the uninoculated blocks is considered to represent natural development due to airborne propagules of micro-organisms introduced from the atmosphere. Also the blocks in propagator 2 turned reddish, which is more equivalent to the initial colonization of a stone surface in the natural state, while the blocks in Propagator 1 turned greenish black, as higher organisms flourished more quickly in the nutritive medium. In both cases, distribution of colour on the blocks was affected by the surface shape of the blocks as high points which tended to be drained quickly developed less growth.

TABLE 2

| concentration | ingredient |
| --- | --- |
| 1.25 gm/l | $KNO_3$ |
| 1.25 gm/l | $KH_2PO_4$ |
| 0.25 gm/l | $MgSO7H_2O$ |
| 0.30 gm/l | $Na_3C_6H_5O_7 2H_2O$ (Tri sodium citrate) |
| 0.036 gm/l | $Fe_2(SO_4)2$ |
| 0.32 gm/l | $CaCl_2 2H_2O$ |
| 7.2 mg/l | $H_3BO_3$ |
| 4.6 mg/l | $MnCl_2 4H_2O$ |
| 0.56 mg/l | $ZnSO_4 7H_2O$ |
| 0.98 mg/l | $Na_2MoO_4 2H_2O$ |
| 0.20 mg/l | $CuSO_4 5H_2O$ |
| 0.10 mg/l | $CoCl_2 6H_2O$ |

EXAMPLE 2

A section of a nearly vertical face in a Carboniferous Limestone quarry in North Wales was marked out in six panels each 1.8 meters wide and 5.4 meters high. Two panels were provided with spray equipment to deliver medium solution as specified above in Table 2 in locally collected rainwater with an added suspension of innoculant derived from old quarry surfaces. The innoculant was allowed to self-culture in the metering tank which delivered the solution. Prior to this operation one of these two panels was pre-treated for six months with two applications daily of innoculant suspended in rainwater at a rate of 0.65 liters per square meter but with no medium. Two more panels were provided with local rainwater and the remaining two were supplied with no water other than natural rainfall. The face had an open Southwest aspect into the prevailing wind and had an elevation of about 310 meters above sea level and thus is described as very exposed. Treatment extended over the period from the end of March to the end of October with spraying on the irrigated panels twice daily at a rate of 0.65 liters per square meter.

During the operation, the panels were photographed at monthly intervals in order to record the development. By mid May, the panel which had been pre-treated with innoculant and treated with medium was noted to be developing green organisms in cracks in the stones. This development subsequently strengthened and spread out onto plane surfaces, but the latter development was inhibited by the tendency of the spray as delivered to collect into channels provided by cracks and crevices in the stone in order to run down the face. Development in these channels continued to grow strongly, darkening to a greenish black towards the end of the operation. Cluster analysis using the Idrisi geographical information system software showed approximately 9% colour change coverage of the total area when viewed from 20 meters away. The adjacent unpre-treated medium sprayed panel developed lesser amounts of green organisms with cluster analysis showing colour change coverage of approximately 2% of the total area as viewed from 20 meters away. Minor visible organic development was apparent on the plain water irrigated panels, and the unwatered ones, but this was too sporadic to give a meaningful cluster analysis of colour change.

Tests for DNA on the green areas indicated organic development. It may be noted that the methods and procedures given herein are typical of those well known in the art, and as such, are also illustrated by example in the following U.S. Pat. Nos. 6,099,615 and 5,244,493.

Although the invention has been described with reference to preferred embodiments and specific examples, it will be readily appreciated by those of ordinary skill in the art that many modifications and adaptations of the invention are possible without departure from the spirit and scope of the invention claimed as claims hereafter. For example, while the process according to the present invention has been described in terms of darkening light coloured stone surfaces of limestone composition, the process is equally applicable to other stone types such as sandstone, mudstone, conglomerate, and metamorphic and igneous stone.

Similarly, the process is equally applicable to concrete surfaces both cost in-situ and precast.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of this invention.

What is claimed is:

1. A method for treating a hard, rigid surface, consisting of the steps of:
   providing a rigid material to be treated from one of the following group: rock, stone, concrete or a resinous rigid man made material;
   providing a quantity of naturally occurring microorganisms;
   providing a quantity of nutritive media for the microorganisms to flourish in;
   mixing together both the quantities of microorganisms and nutritive media to create a lithobiont mixture; and
   applying the lithobiont mixture to the surface of the rigid material at regular intervals so as to allow the microorganisms to propagate on the surface and after a period of time, create a substantially light tone to a substantially dark tone on the surface of a rigid material.

2. The method according to claim 1 wherein the lithobiont mixture is applied to the surface of the rigid material by means of a spraying device.

3. The method according to claim 2 wherein the sprayer for the lithobiont mixture is on automatic device which will dispense the mixture for predetermined periods after predetermined intervals of time between applications of the mixture.

4. The method according to claim 1 wherein the lithoblont mixture is applied to the surface of the rigid material by means of a brush.

5. The method according to claim 1 wherein the naturaly occurring microorganisms were selected by removing a quantity of surface materials from a nearby location.

6. The method according to claim 1 wherein the naturally occurring microorganisms were selected by removing a quantity of surface materials from a location previously selected which has a substantially identical climate to the location where the hard rigid materials to be treated are located within.

7. The method according to claim 1 wherein the naturally occurring microorganisms were selected by removing a quantity of surface materials from a location previously selected which contains substantially identical microorganisms to the location where the hard rigid materials to be treated are located within.

8. The method according to claim 1 wherein after the lithobiont mixture has been created, it is then further incubated at a temperature in a range chosen to facilitate further growth of the microorganisms.

9. The method according to claim 8 wherein the temperature range chosen for further incubation is substantially from 15 degrees to 43 degrees Celsius.

10. The method according to claim 8 wherein the temperature range chosen for further incubation is substantially from 32 to 43 degrees Celsius.

11. The method according to claim 1 wherein the period of time for applying the mixture to the rigid material is substantially from 6 to 36 months in order to create a darker more natural color on the surface of the rigid material.

12. The method according to claim 1 wherein the time period between applications of the lithobiont mixture is substantially twice per day.

13. The method according to claim 1 wherein the time period between applications of the lithoblont mixture is substantialiy from 6 to 36 hours.

14. The method according to claim 1 wherein the nutritive media contains at least one material selected from the following group of anions: potassium, magnesium, sodium, iron, hydrogen, manganese, zinc, copper or cobalt.

15. The method according to claim 1 wherein the nutritive media contains at least one material selected from the following group of cations: nitrate, phosphate. sulphate, citrate, borate, chloride or molybdenote.

16. The method according to claim 14 wherein the nutritive media further contains at least one material selected from the following group of cations: nitrate, phosphate, sulphate, citrate, borate, chloride or molybdmnate.

17. The method according to claim 1 wherein the lithobiont mixture is further mixed with adhesive means prior to its application to the hard rigid surface.

18. The method according to claim 1 wherein the lithobiont mixture is further mixed with dye marker means prior to its application to the hard rigid surface.

19. The method according to claim 18 which creates the following product: a rigid material wherein its surface has been covered with nutritive media, microorganisms and dye marker means.

20. The method according to claim 1 which created the following product: a rigid material wherein its surface has been covered with nutritive media, microorganisms and an adhesive.

21. The method according to claim 1 wherein the rigid material is one selected from the following group: freshly cut rack or stone, freshly formed concrete, or a freshly formed resinous building material.

22. The method according to claim 1 wherein the time period between application of the lithobiont mixture is substantially one week.

* * * * *

UNITED STATES PATENT AND TRADEMARK OFFICE
CERTIFICATE OF CORRECTION

PATENT NO. : 6,967,098 B2  
DATED : November 22, 2005  
INVENTOR(S) : Robert Gunn It is certified that error appears in the above-identified patent and that said Letters Patent is hereby corrected as shown below:

Column 7,  
Line 30, change "therefrom" to -- thereafter --.  
Line 60, change "man mad" to -- man made --.

Column 9,  
Line 9, change "programm" to -- program --.

Signed and Sealed this

Twenty-first Day of March, 2006

JON W. DUDAS  
*Director of the United States Patent and Trademark Office*